(12) United States Patent
Davis

(10) Patent No.: US 10,647,241 B2
(45) Date of Patent: May 12, 2020

(54) TRUCK CADDY

(71) Applicant: Floyd Davis, Antioch, IL (US)

(72) Inventor: Floyd Davis, Antioch, IL (US)

( * ) Notice: Subject to any disclaimer, the term of this patent is extended or adjusted under 35 U.S.C. 154(b) by 0 days.

(21) Appl. No.: 15/621,573

(22) Filed: Jun. 13, 2017

(65) Prior Publication Data

US 2018/0354400 A1  Dec. 13, 2018

(51) Int. Cl.
*B60P 1/00* (2006.01)
*B60P 1/64* (2006.01)
*B60P 7/13* (2006.01)
*B60P 7/135* (2006.01)

(52) U.S. Cl.
CPC .............. *B60P 1/6427* (2013.01); *B60P 7/13* (2013.01); *B60P 7/135* (2013.01)

(58) Field of Classification Search
CPC ................................. B60P 1/6427; B60P 7/13
USPC .......................................................... 224/404
See application file for complete search history.

(56) References Cited

U.S. PATENT DOCUMENTS

| | | | | |
|---|---|---|---|---|
| 4,266,821 A * | 5/1981 | Gillet | ...................... | B60R 11/06 224/404 |
| 4,828,312 A * | 5/1989 | Kinkel | .................... | B60R 11/06 16/94 R |
| 5,083,829 A * | 1/1992 | Fonseca | ............... | B62D 35/001 224/404 |
| 5,232,259 A * | 8/1993 | Booker | ................... | B60R 11/06 224/404 |
| 5,253,913 A | 10/1993 | Metivier | | |
| 5,498,049 A * | 3/1996 | Schlachter | ............... | B60R 9/00 224/404 |
| 5,628,442 A | 5/1997 | Wayne | | |
| 8,281,967 B2 * | 10/2012 | Evans | ....................... | B60R 9/00 224/404 |
| 9,132,785 B2 * | 9/2015 | Roach | ..................... | B60R 9/065 |
| 9,193,307 B2 * | 11/2015 | Roach | ................... | B60P 7/0892 |
| 9,463,751 B1 * | 10/2016 | Grubenhoff | .......... | B62D 33/046 |
| 9,527,454 B2 | 12/2016 | Smith et al. | | |
| 9,566,915 B1 | 2/2017 | Singer | | |
| 9,573,530 B1 | 2/2017 | Singer | | |
| 2002/0190536 A1 * | 12/2002 | Getzschman | ............. | B60R 9/00 296/37.6 |
| 2007/0196193 A1 * | 8/2007 | Hill | ........................ | B60P 3/079 410/23 |

(Continued)

*Primary Examiner* — Peter N Helvey
(74) *Attorney, Agent, or Firm* — Jansson Munger McKinley & Kirby Ltd.

(57) ABSTRACT

A caddy for a pickup truck having a truck bed. The caddy including a body member and at least two elongate members securing the body member with respect to an interior of the truck. The body member having a bottom wall positionable on a floor of the truck bed, a forward wall extending upwardly from the bottom wall across the truck bed, and a pair of sidewalls positionable along lateral sides of the truck and each connected to the bottom and forward walls. The at least two elongate members are of a plurality of elongate members with an elastic length. Each of the at least two elongate members extends upwardly from a lower position at the interior of the truck toward a higher position at the corresponding one of the sidewalls. The elastic length of each of the at least two elongate members is stretched between the lower and upper positions, thus pulling the body member toward the floor of the truck bed.

21 Claims, 6 Drawing Sheets

(56) References Cited

U.S. PATENT DOCUMENTS

| | | | |
|---|---|---|---|
| 2012/0261452 A1* | 10/2012 | Roach | B60P 7/0892 |
| | | | 224/404 |
| 2016/0001824 A1 | 1/2016 | Allen | |
| 2016/0185268 A1 | 6/2016 | Nachtman | |
| 2016/0347261 A1 | 12/2016 | Howell | |

* cited by examiner

TRUCK CADDY

FIELD OF THE INVENTION

This invention relates generally to the field of vehicular accessories, and more specifically to the field of truck bed organization. More specifically, the present invention relates to vehicle cargo area accessories for retaining materials and packages.

BACKGROUND OF THE INVENTION

Cargo spaces and cargo areas provided in motor vehicles typically used for hauling are generally large expanses of space that are intended for large loads. While users of the vehicles in this category (vans and pickup trucks) sometimes require the entire amount of available cargo space when they carry loads of lumber, loose materials, gravel and the like, not all users require such large space, and even those users who generally require such space do not need such space at all times.

In fact, there are many circumstances under which smaller segments or smaller spaces would be desired. For example, the owner of a pickup truck may occasionally wish to use this truck for grocery shopping. In such circumstance, it may be desired to place the grocery bag within the confines of the cargo area of the motor vehicle, whether this cargo area is a bed of a pick-up or the interior space of a van.

While there are interior dividing walls available on the market that may be disposed within the cargo area of the vehicle, some of these known cargo area dividing systems include special hardware which require altering the original vehicle structure and mounting the accessory in a fixed place. Furthermore, such complex installation also makes it very difficult to remove such accessory from the vehicle. Some other known cargo area accessories remain unsecured to the vehicle and thus carry the risk of unintended displacement during driving. Accordingly, the prior art has failed to provide a system that can be easily installed and removed from the vehicle to efficiently and properly restrain smaller items in the vehicle cargo areas.

The present invention is directed to overcoming one or more of these problems as set forth above.

SUMMARY OF THE INVENTION

The present invention relates to a truck-bed caddy in combination with a pick up truck having a truck bed. The truck-bed caddy includes a body member and at least two elongate elastic members securing the body member with respect to the interior of the truck. The body member has a bottom wall positionable on a floor of the truck bed, a forward wall extending upwardly from the bottom wall across the truck bed, and a pair of sidewalls positionable along lateral sides of the truck and each connected to the bottom and forward walls. The at least two elongate members are of a plurality of elongate members, each with an elastic length.

In certain embodiments, each of the at least two elongate members may extend upwardly from a lower position at the interior of the truck bed toward a higher position at the corresponding one of the sidewalls. The elastic length of each of the at least two elongate members is stretched between the lower and upper positions, thus pulling the body member toward the floor of the truck bed.

The stretched elastic length of each of the at least two elongate members may be further stretchable such that the body member can be movable rearwardly onto an open tailgate of the truck to facilitate access to contents of the caddy over the tailgate.

The body member may be a single-piece structure. Such single-piece structure may be formed by molding or thermoforming of a suitable polymeric material. Different versions may be formed by separate pieces of a suitable material, such as plastic, metal, wood etc. Such separate pieces may be interconnected by welding, when applicable, or utilizing suitable brackets secured to each of adjacent walls with fasteners.

In some examples, the body member has a forward cross-dimension which is greater than a dimension of the truck bed between inward wheel structures. In such examples, the inward wheel structures hold the body member from sliding forward and maintain the position of the body member at the tailgate.

When the entire space of the truck bed is needed, the body member may be positioned against a truck cabin wall to free the tailgate-adjacent space of the truck bed for cargo.

In some embodiments, the body member has a plurality of sliders at a lower surface of the bottom wall. The sliders decrease friction of the lower surface against the floor of the truck bed to facilitate rearward pulling of the caddy onto an open tailgate. The sliders may be part of the bottom wall. Alternatively or in addition, the sliders may be elongate ski members secured with respect to the lower surface of the bottom wall. A material of each ski member would have a coefficient of friction lower than a material of the bottom wall.

In certain embodiments, the body member has at least one hand grip at a rearward region of the body member to facilitate the rearward pulling of the caddy. In some of such embodiments, the at least one hand grip is a hand hole formed through a rearward end of the bottom wall. Alternatively or in addition, the at least one hand grip may be a handle extending from the rearward region of the body member. The handle may extend upwardly from an upper surface of the bottom wall.

The forward wall and the sidewalls may each define a plurality of openings for engagement by opposite ends of the elongate members.

In some of such versions, the openings defined by the forward wall include holes formed through an upper end of the forward wall. At least some of the openings defined by each of the sidewalls include notches formed along a rearward end of each of the sidewalls. In addition or alternatively, the openings defined by each of the sidewalls include forward openings formed along a forward end of each of the sidewalls.

The opposite ends of each of the elongate members may each have a hook member. To secure the body member with respect to the truck, the hook member at one end of each of the at least two elongate members may engage one of the notches of the corresponding sidewall. The hook member at the opposite end of each of the at least two elongate members may engage one of the forward openings of the corresponding sidewall.

The elongate members may be positioned in different configurations to form at least one retainer for contents of the caddy. For example, in order to partition the caddy or to secure contents of the caddy, one end of at least one of the plurality of elongate members may engage one of the openings, and the other end of such elongate member may engage a different one of the plurality of openings.

DETAILED DESCRIPTION OF PREFERRED EMBODIMENTS

Figure 4:
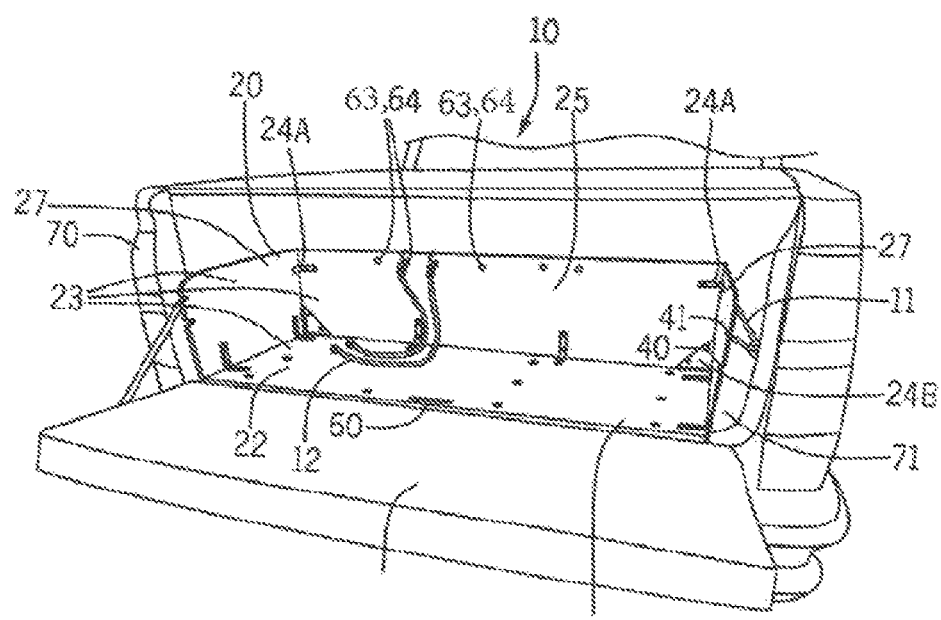
FIG. 4 is a perspective view of the truck-bed caddy of FIG. 3, showing the cargo area of the caddy.
Figure 5:
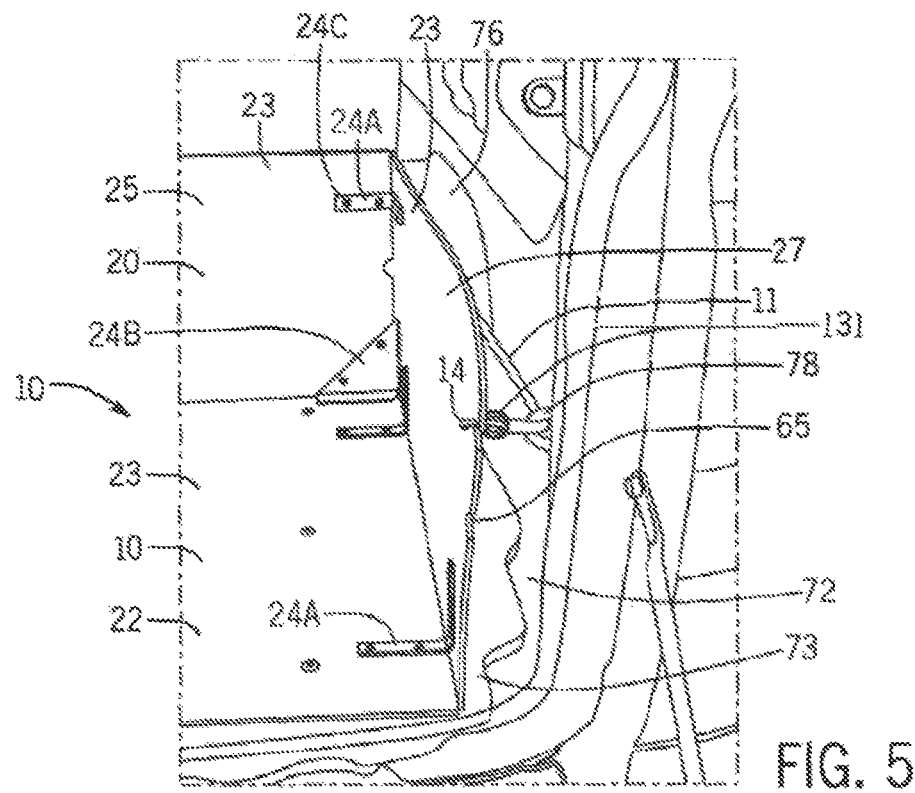
FIGS. 5 and 6 are fragmentary perspective views of the truck-bed caddy of FIG. 3, showing securement of the sidewalls of the caddy with respect to the interior of the truck bed.
Figure 6:
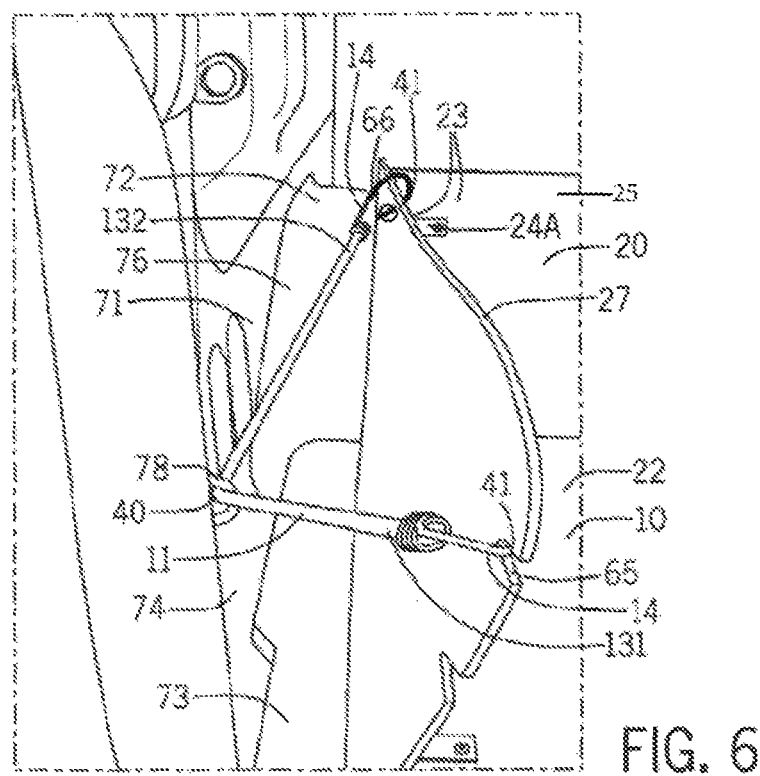

FIGS. 1-12 illustrate exemplary embodiments of a caddy 10 for a pickup truck 70 having a truck bed 71. FIGS. 5 and 6 best show truck-bed caddy 10 including a body member 20 and a pair of elongate elastic members 11 securing the body member 20 with respect to the interior 72 of the truck. Body member 20 has a bottom wall 22 positionable on a floor 73 of truck bed 71, a forward wall 25 extending upwardly from bottom wall 22 across truck bed 71, and a pair of sidewalls 27 positionable along lateral sides 74 of truck 70 and each connected to bottom wall 22 and forward wall 25.

FIGS. 5-8 show two elongate members 11 which are of a plurality of elongate members 12, each with an elastic length.

FIGS. 4-6 also illustrate each of elongate members 11 extending upwardly from a lower position 40 at interior 72 of truck bed 71 toward higher positions 41 at the corresponding one of sidewalls 27. The elastic length of each of elongate members 11 is stretched between lower position 40 and upper positions 41, thus pulling body member 20 toward floor 73 of truck bed 71.

Figure 7:
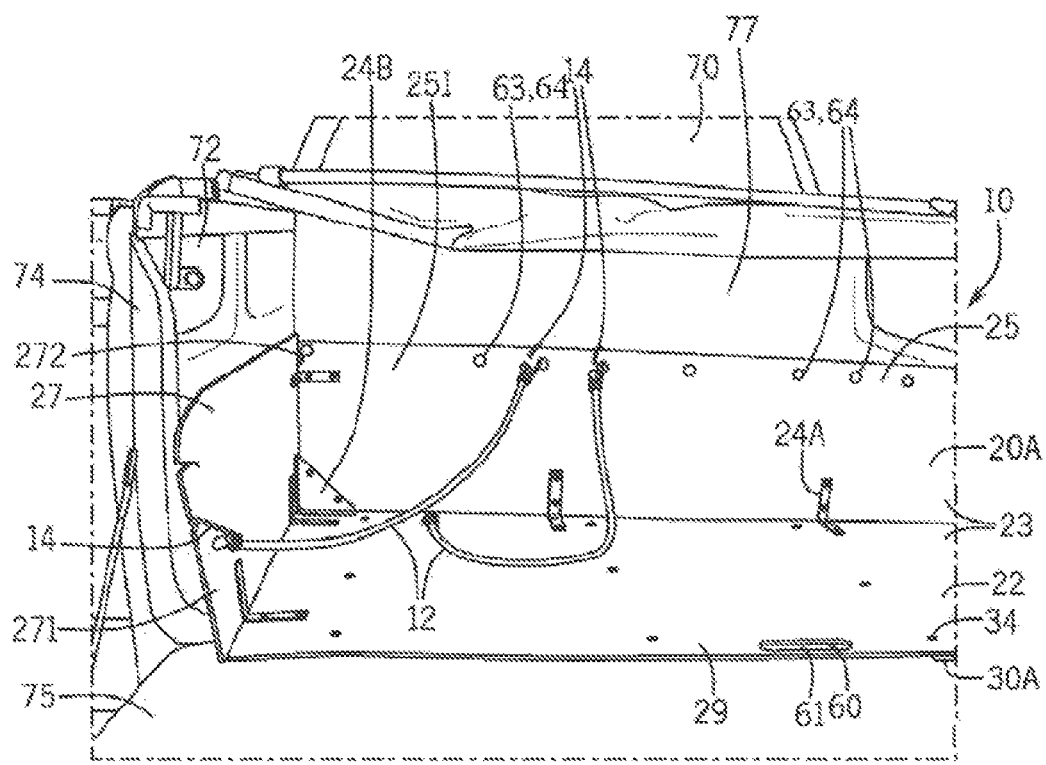
FIG. 7 is a perspective view of the truck-bed caddy of FIG. 3, showing the rearward pulling of the caddy secured to the truck.
Figure 8:
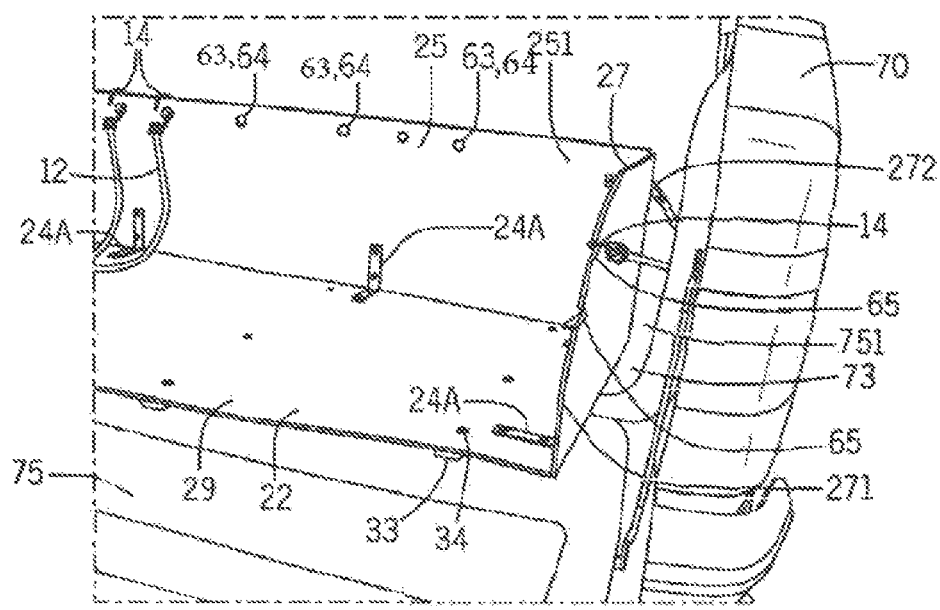
FIG. 8 is a fragmentary perspective view of one side of the caddy of FIG. 7.

FIGS. 1 and 4-8 show forward wall 25 and sidewalls 27 each defining a plurality of openings 63 for engagement by opposite ends 132 of elongate members 12. FIGS. 4, 7 and 8 show forward wall 25 having openings 63 as holes 64 formed through an upper end 251 of forward wall 25. FIGS. 1 and 4-8 show sidewalls 27 having at least some of openings 63 as notches 65 formed along a rearward end 271 of each of sidewalls 27. It is also seen in FIGS. 5 and 6 that openings 63 in body member 20 include forward openings 66 formed at a forward end 272 of each of sidewalls 27.

As best seen in FIGS. 6 and 7, opposite ends 13 of each of elongate members 11 and 12 each have a hook member 14. FIG. 6 shows that to secure body member 20 with respect to truck 70, hook member 14 at one end 131 of each of elongate members 11 engages one of notches 65 at rearward end 271 of the corresponding sidewall 27. Hook member 14 at the opposite end 132 of elongate member 11 engages one of forward openings 66 of the corresponding sidewall 27. It is also seen in FIGS. 5 and 6 that for securement of caddy 10 elongate members 11 engage existing truck structures such as a loop member 78 on interior 72 of lateral side 74 of truck bed 71.

Elongate members 12 may be positioned in different configurations to retain contents 50 of caddy 10. FIG. 7 shows an example of partitioning caddy 10 by engaging hole 64 through forward wall 25 with hook 14 of one end 131 of elongate members 12 and notch 65 in rearward end 271 of sidewall 27 with hook 14 of opposite end 132 of such elongate member 12.

FIGS. 7 and 8 also show the stretched elastic length of each of elongate members 11 further stretched such that body member 20 is moved rearwardly onto an open tailgate 75 of truck 70 to facilitate access to contents 50 of caddy 10 over tailgate 75.

Figure 1:
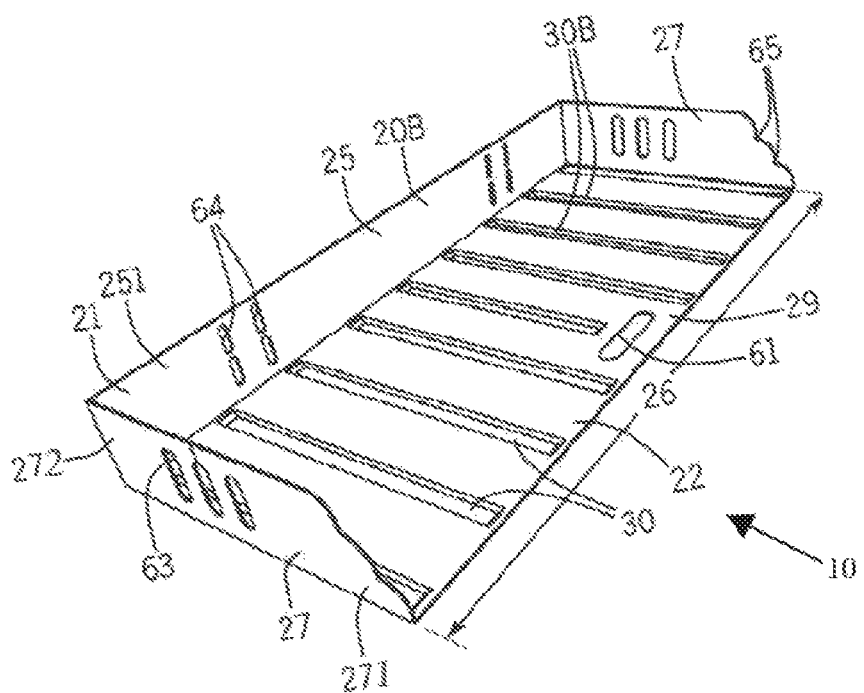
FIG. 1 is a perspective view of one embodiment of a truck-bed caddy according to the present invention.
Figure 9:
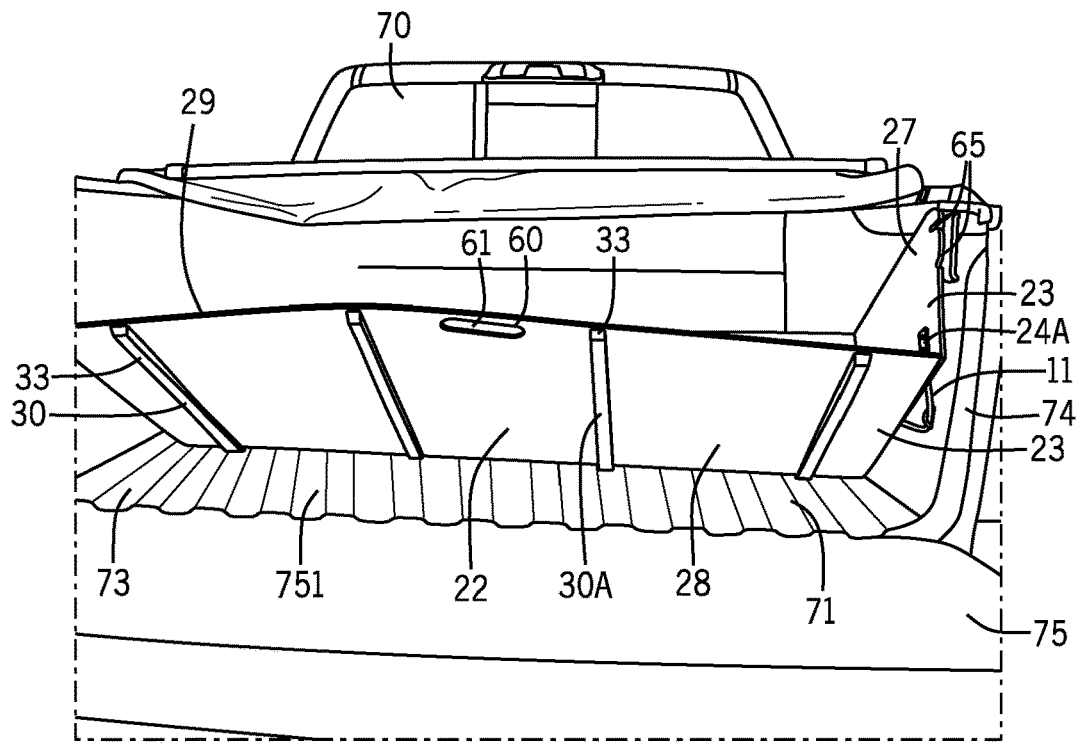
FIG. 9 is a perspective view of the truck-bed caddy of FIG. 7, showing sliders at a lower surface of the bottom wall of the caddy.
Figure 10:
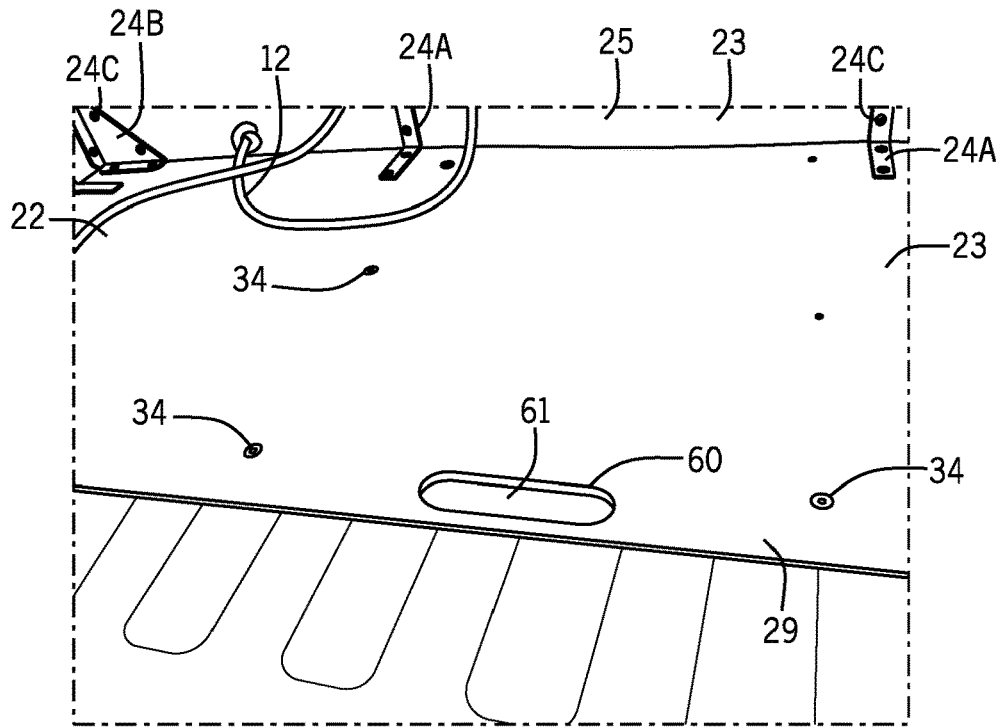
FIG. 10 is a fragmentary perspective view of the truck-bed caddy of FIG. 7, showing a hand hole at a rearward end of the bottom wall.

FIGS. 1 and 9 show body member 20 having a plurality of sliders 30 at a lower surface 28 of bottom wall 22. Sliders 30 decrease friction of lower surface 28 against floor 73 of truck bed 71 to facilitate movement rearwardly, as illustrated in FIGS. 7, 8 and 10. FIG. 1 shows sliders 30B which are formed as part of bottom wall 22. In FIG. 9, sliders 30A are shown as elongate ski members 33 secured with respect to lower surface 28 of bottom wall 22. FIGS. 9 and 10 show screws 34 securing ski members 33 to bottom wall 22. Alternative methods of securement, such as adhesive or other suitable ways, may also be used. It is also shown in FIG. 9 that ski members 33 are made of a material which is different from the material of bottom wall 22 such that ski members 33 have a coefficient of friction lower than bottom wall 22.

FIGS. 1-4 and 7-12 show body member 20 having a hand grip 60 at a rearward region 29 of body member 20 to facilitate rearward pulling of caddy 10 onto open tailgate 75. FIGS. 1-4 and 7-12 show hand grip as a hand hole 61 formed through bottom wall 22 at rearward region 29 of body member 20.

Figure 2:
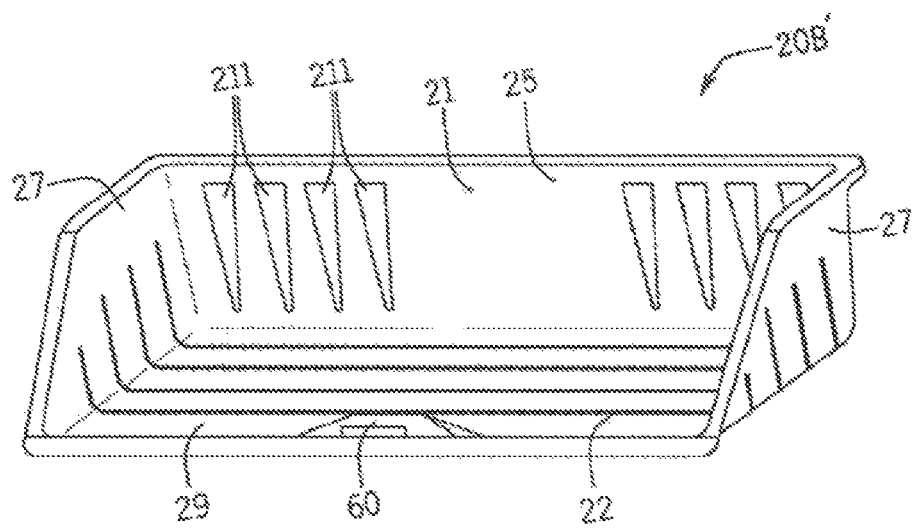
FIG. 2 is a perspective view of another embodiment of a truck-bed caddy.
Figure 3:
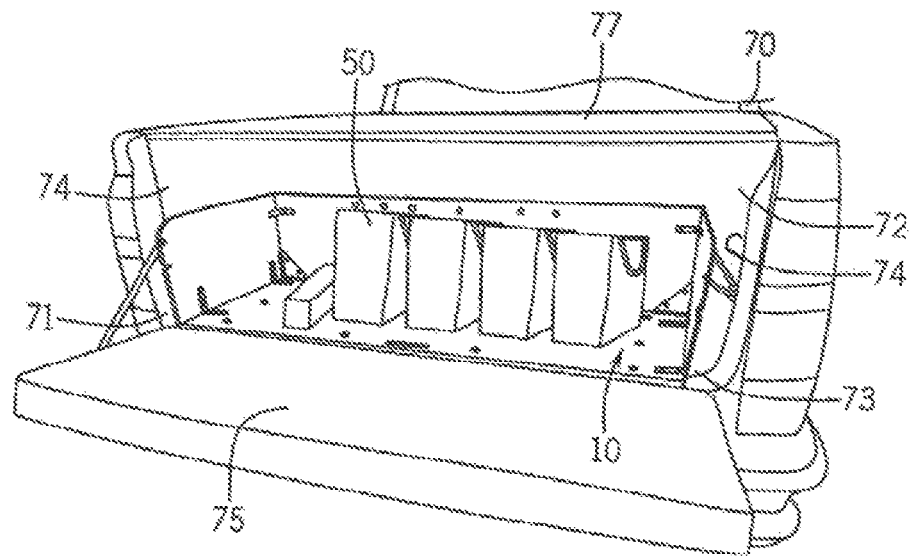
FIG. 3 is a perspective view showing yet another version of a truck-bed caddy in a truck bed.
Figure 11:
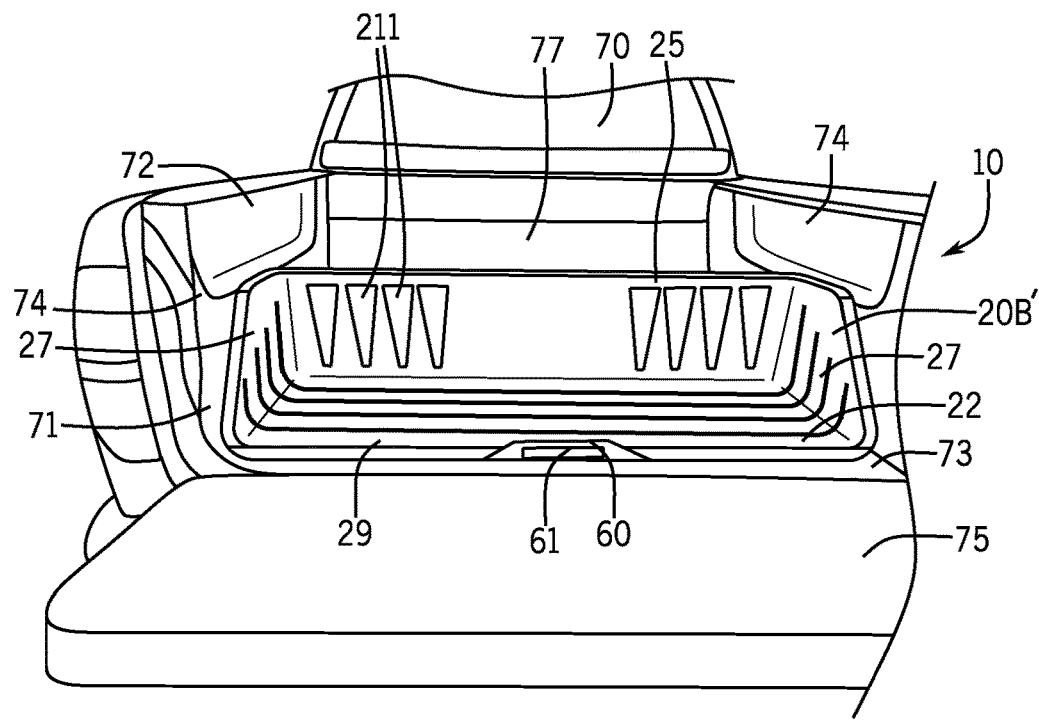
FIG. 11 is a rearward perspective view showing still another version of a truck-bed caddy positioned in a truck bed.
Figure 12:
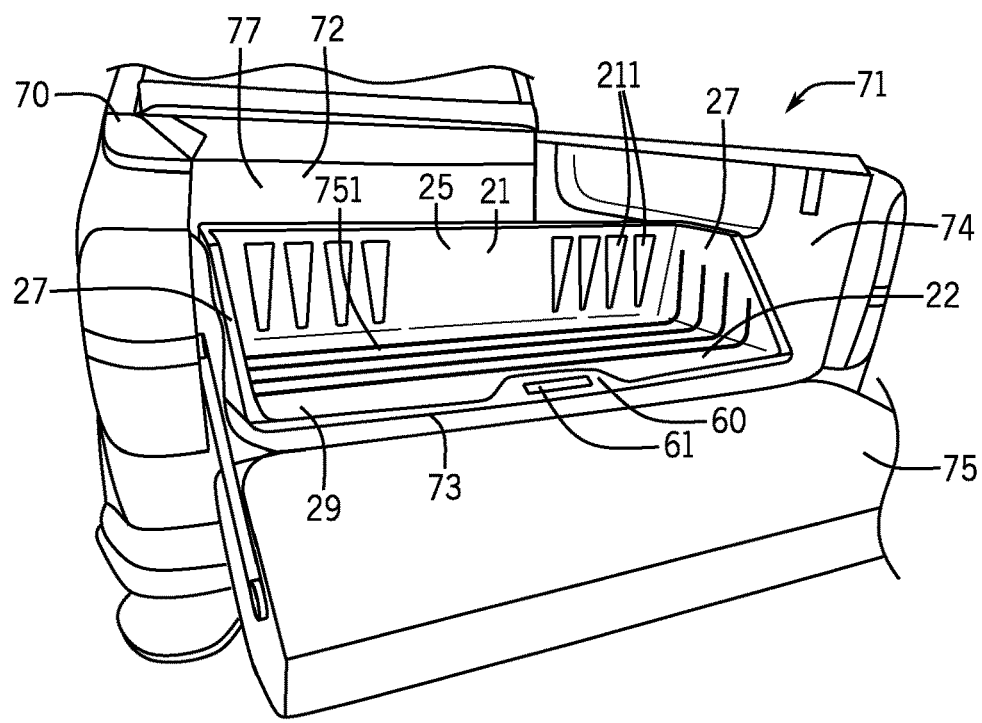
FIG. 12 is another perspective view of the caddy of FIG. 11 shown from a different angle.

FIGS. 1, 2, 11 and 12 show body member 20B as a single-piece structure 21. Such single-piece structure may be formed by the molding or thermoforming of a suitable polymeric material. FIG. 1 shows an example of single-piece structure 21A. FIGS. 2, 11 and 12 show single-piece structure 21B' incorporating vertical ribbing, improving rigidity of structure 21W.

FIGS. 3-9 show a version of body member 20A formed by separate pieces 211 of a rigid plastic material. Separate pieces 23 are shown interconnected by brackets 24A and 24B secured at junctions between adjacent walls 22, 25 and 27 with fasteners 24C.

In FIGS. 5 and 6, body member 20 has a forward cross-dimension 26 (shown in FIG. 1) which is greater than a dimension of truck bed 71 between inward wheel structures 76. Inward wheel structures 76 maintain the position of body member 20 at tailgate 75 by holding body member 20 from forward sliding when truck 70 is moving. However, as shown in FIG. 12, body member 20 may be positioned against a truck cabin wall 77 to free the tailgate-adjacent space 751 of truck bed 71 for large cargo requiring a majority of the entire space of truck bed 71.

While the principles of the invention have been shown and described in connection with specific embodiments, it is to be understood that such embodiments are by way of example and are not limiting.

The invention claimed is:

1. In combination with a pickup truck having a truck bed, a truck-bed caddy comprising:

a body member having a bottom wall, a forward wall extending upwardly from the bottom wall across the truck bed, and a pair of sidewalls each connected to the bottom and forward walls; and at least two elongate members movably securing the body member with respect to an interior of the truck in a position rearward of inward truck wheel structures and permitting rearward movement of the secured body member onto an open tailgate.

2. The truck-bed caddy of claim 1 wherein each of the at least two elongate members extends rearwardly from the body member into engagement with interior truck structures adjacent the tailgate.

3. The truck-bed caddy of claim 2 wherein:
each of the at least two elongate members has an elastic length extending upwardly from a lower position at the interior of the truck toward a higher position at the corresponding one of the sidewalls; and
the elastic length of each of the at least two elongate members is stretched between the lower and higher positions, thus pulling the secured body member toward the floor of the truck bed.

4. The truck-bed caddy of claim 2 wherein:
the forward wall and the sidewalls each define a plurality of openings for engagement with opposite ends of the plurality of the elongate members forming at least one retainer for contents of the caddy; and
the opposite ends of each of the elongate members each have a hook member.

5. The truck-bed caddy of claim 4 wherein:
the openings defined by each of the sidewalls include forward and rear openings formed along corresponding ends of each of the sidewalls; and
the hook member at the opposite ends of each of the elongate members engages one of the forward and rear openings of the corresponding sidewall.

6. The truck-bed caddy of claim 1 wherein the body member has at least one hand grip at a rearward region of the body member to facilitate the rearward pulling.

7. The truck-bed caddy of claim 6 wherein the at least one hand grip is a hand hole formed through a rearward end of the bottom wall.

8. The truck-bed caddy of claim 1 wherein the body member has a cross-dimension between the sidewalls which is greater than a distance across the truck bed between inward truck wheel structures.

9. A caddy for a pickup truck having a truck bed, the caddy comprising:
a body member having a bottom wall positionable on a floor of the truck bed, a forward wall extending upwardly from the bottom wall between a pair of sidewalls each connected to the bottom and forward walls; and
an elongate member secured to the body member and extending rearwardly into engagement with interior truck structures adjacent a tailgate such that the body member is movably secured with respect to an interior of the truck permitting rearward pulling of the secured body member onto the open tailgate to facilitate access to contents of the caddy over the tailgate.

10. The truck-bed caddy of claim 9 wherein the forward wall and the sidewalls each define a plurality of openings each for engagement by one of opposite ends of a plurality of elastic members forming a retainer for contents of the caddy.

11. The truck-bed caddy of claim 10 wherein:
one end of at least one of the plurality of elastic members engages one of the openings; and
the other end of such elastic member engages a different one of the plurality of openings.

12. The truck-bed caddy of claim 10 wherein the openings defined by the forward wall include holes formed through an upper end of the forward wall.

13. The truck-bed caddy of claim 9 wherein the bottom and forward walls and sidewalls are separate pieces interconnected by brackets secured at junctions between the adjacent walls.

14. The caddy of claim 9 wherein the body member has at least one hand grip at the rearward region of the body member to facilitate rearward pulling of the caddy onto an open tailgate of the truck to facilitate access to contents of the caddy over the tailgate.

15. The truck-bed caddy of claim 9 wherein:
the elongate member has an elastic length extending upwardly from lower positions at the interior of the truck toward higher positions along the body member; and
the elastic length is stretched between the lower and higher positions, thus pulling the secured body member toward the floor of the truck bed.

16. A caddy for a pickup truck having a truck bed, the caddy comprising upward walls extending from a bottom wall wider between the upward walls than a truck-bed dimension between inward truck wheel structures movably retaining the caddy rearward of inward truck wheel structures and permitting rearward movement of the caddy onto an open tailgate to facilitate access to contents of the caddy over the tailgate.

17. The truck-bed caddy of claim 16 further comprising an elongate member extending rearwardly from the upward walls into engagement with interior truck structures adjacent the tailgate such that the secured caddy is movable rearwardly onto the open tailgate.

18. The truck-bed caddy of claim 17 wherein the elongate member has an elastic length extending downwardly from higher positions along the upward walls toward lower positions at the interior of the truck such that the stretched elastic length pulls the caddy toward the floor of the truck bed.

19. The truck-bed caddy of claim 18 wherein:
the upward walls include a forward wall and sidewalls each defining a plurality of openings for engagement by opposite ends of elastic members forming at least one retainer for contents of the caddy; and
the opposite ends of each of the elastic members each have a hook member.

20. The truck-bed caddy of claim 16 wherein the upward walls include a forward wall and sidewalls.

21. The truck-bed caddy of claim 20 wherein the bottom and forward walls and sidewalls are separate pieces interconnected by brackets secured at junctions between the adjacent walls.

* * * * *